United States Patent [19]

Patterson et al.

[11] 4,089,741
[45] May 16, 1978

[54] MIXING VANE GRID SPACER

[75] Inventors: John F. Patterson; Kirk P. Galbraith, both of Richland, Wash.

[73] Assignee: Exxon Research & Engineering Co., Linden, N.J.

[21] Appl. No.: 695,262

[22] Filed: Jun. 11, 1976

Related U.S. Application Data

[62] Division of Ser. No. 554,000, Feb. 28, 1975.

[51] Int. Cl.² .............................................. G21C 3/34
[52] U.S. Cl. ..................................... 176/87; 176/76; 29/455 LM; 29/469
[58] Field of Search ...................... 176/40, 61, 76, 78, 176/87; 29/455, 469, 524, DIG. 38

[56] References Cited

U.S. PATENT DOCUMENTS

| 3,115,447 | 12/1963 | Stengel | 29/469 X |
| 3,676,267 | 7/1972 | Fairbanks | 29/455 X |
| 3,764,470 | 10/1973 | Calvin | 176/76 |
| 3,809,609 | 5/1974 | Krawiec et al. | 176/78 |
| 3,814,666 | 6/1974 | Calvin | 176/78 |
| 3,862,000 | 1/1975 | Pugh et al. | 176/78 |

Primary Examiner—Peter A. Nelson
Attorney, Agent, or Firm—F. Donald Paris

[57] ABSTRACT

An improved mixing vane grid spacer having enhanced flow mixing capability by virtue of mixing vanes being positioned at welded intersecting joints of the spacer wherein each mixing vane has an opening or window formed therein substantially directly over the welded joint to provide improved flow mixing capability. Some of the vanes are slotted, depending on their particular location in the spacers. The intersecting joints are welded by initially providing consumable tabs at and within each window, which are consumed during the welding of the spacer joints.

3 Claims, 6 Drawing Figures

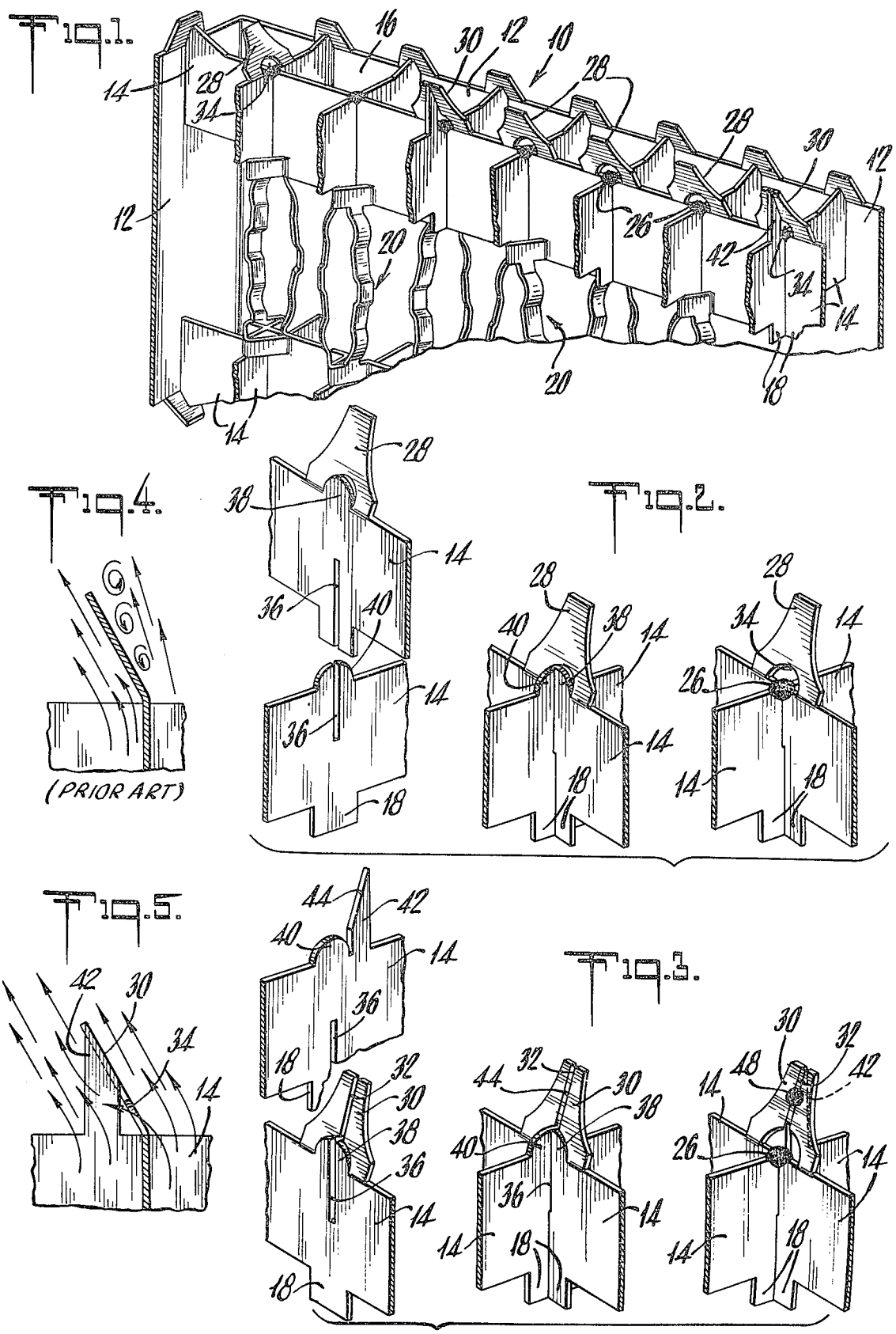

MIXING VANE GRID SPACER

This is a division, of application Ser. No. 554,000, filed Feb. 28, 1975.

BACKGROUND OF THE INVENTION

The present invention relates generally to nuclear reactors and more particularly to grid spacers for use in fuel bundles employed in such reactors for maintaining fuel elements in parallel array therein. These grid spacers are important in the design of nuclear power reactor fuel cores for maintaining the fuel-containing elements in a fixed spaced relationship within the core so that optimum heat generation is achieved over an extended period of time during use of the reactor. If the predetermined special relationship of the elements is not maintained, then satisfactory flow of coolant through the core and about the fissionable fuel material will not be achieved. Consequently, this will result in poor heat transfer efficiency. In connection with maintaining proper flow of coolant in the reactor, there must be a minimization of obstruction to the coolant flow along the fuel elements.

To direct the flow of coolant in the proper direction along the fuel elements, there may be provided mixing vanes which are associated with the grid spacers and are angularly oriented with respect to the direction of coolant flow such that the coolant is caused to assume a desired flow pattern to provide for maximum cooling. Generally, these vanes have been designed to be essentially solid, such that separation of the fluid coolant on the downstream side of the mixing vane results in an overall separation of coolant fluid flow. Pressure differentials resulting from differences in the acceleration of the flow on the upstream and downstream sides of the vanes cause flow separation on its downstream side. This in turn reduces the extent of fluid directional change on the downstream side thereby reducing the extent of interchannel mixing. Because of the fluid separation there will be a corresponding increase in pressure drop of the downstream fluid as well as an obstruction to the directional movement of the fluid between subchannels of the reactor.

SUMMARY OF THE INVENTION

It is an object of the present invention to reduce and substantially eliminate the foregoing problems associated with prior art grid spacer designs, and these and other objects and advantages of the invention will become apparent upon a reading of this disclosure.

Accordingly, there is provided a grid spacer having mixing vanes located at the welded intersecting joints of the spacer strips. Each mixing vane includes a small window formed directly above the junction of the intersecting strips of the grid spacer. The weld at each intersecting joint of the locked strips is provided by means of consumable tabs, one of which is formed on the strip which carries the mixing vane and the other on the strip which intersects with the vane strip. The tab on the vane strip actually comprises the portion removed to the opening or window. In certain instances it is necessary to provide a slot for the length of the vane to accommodate the replacement together of the strips and for the slotted vanes there is provided an upward extending tab from the intersecting strip (which does not carry the vane) to provide support on the underside of the vane in the area of the slot and which may be welded thereto.

Having in mind the above and other objects that will be evident from an understanding of this disclosure, the present invention comprises the combinations and arrangements and method as illustrated and disclosed in the presently preferred embodiment of the invention which is hereinafter set forth in such detail as to enable those skilled in the art readily to understand the function, operation, and construction and advantages of it when read in conjunction with the accompanying drawings.

BRIEF DESCRIPTION OF THE DRAWINGS

FIG. 1 is a perspective view of the portion of a grid spacer constructed in accordance with and incorporating features of the present invention;

FIG. 2 illustrates the construction, arrangement and method of forming non-slotted mixing vanes at certain intersected joints of the grid spacer of FIG. 1;

FIG. 3 illustrates the construction, arrangement and method of formation of the slotted mixing vanes at other intersected joints of the grid spacer of FIG. 1;

FIG. 4 is an elevational view of a prior art mixing vane which produces flow separation;

FIG. 5 is an elevational view of a mixing vane according to the present invention illustrating alleviation of the fluid separation flow problem.

DESCRIPTION OF THE PREFERRED EMBODIMENT

Figure 6:
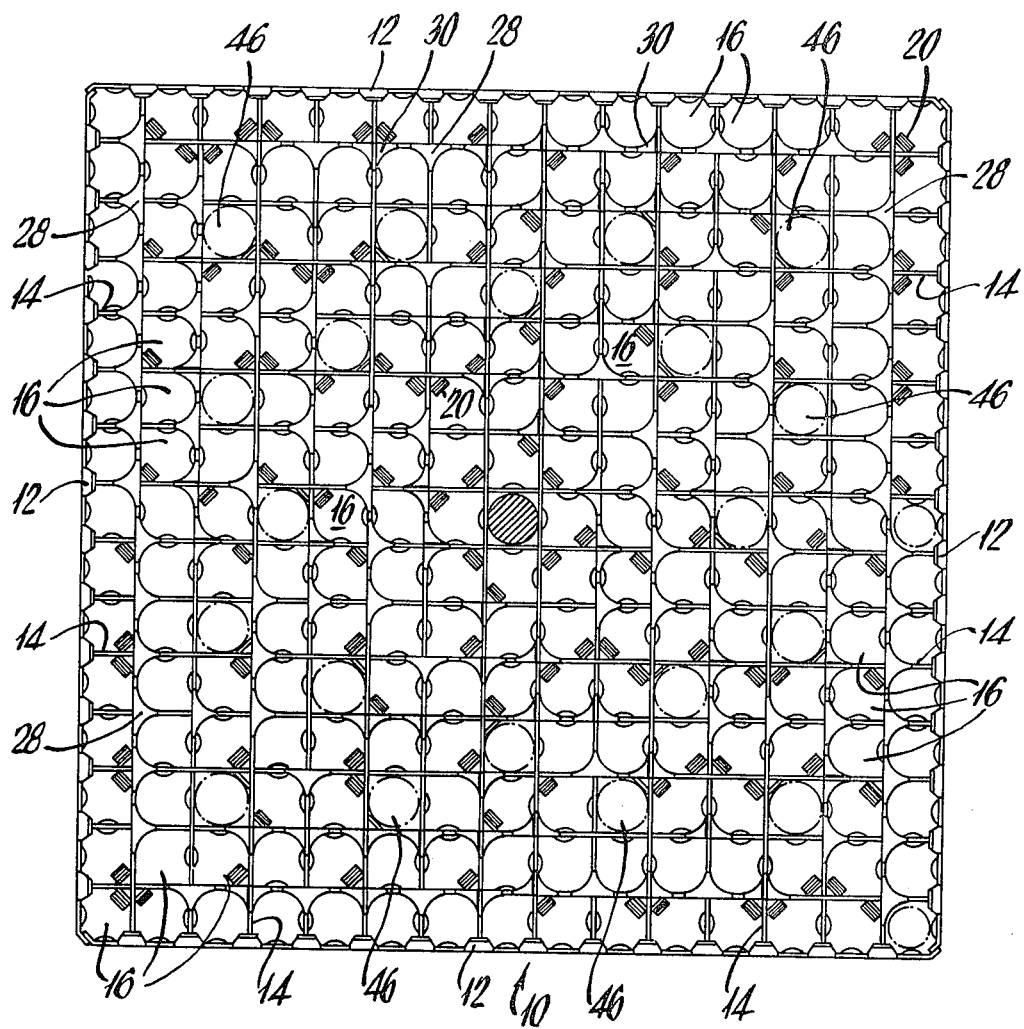
FIG. 6 is a schematic top view of a grid spacer constructed according to and incorporating mixing vanes of the present invention.

Having reference to the drawings wherein like parts are designated by the same reference numeral throughout the several views, the present invention is illustrated in FIG. 1 as embodied in a grid spacer 10 adapted for use in a nuclear fuel core. The spacer comprises the usual peripheral side plates 12 and intersecting spring retaining strips 14 which extend perpendicular within the spacer from the side plates. These strips intersect to form an egg crate structure containing a plurality of openings through which the fuel rod elements extend (see FIG. 6) and are welded in interlocked relationship as discussed in detail hereinafter. In accordance with conventional grid spacers the intersecting and interlocked spring retaining strips are spaced vertically (at the top and bottom of each spacer) and contain at the intersections downwardly and upwardly protruding tabs 18 which provide means for engaging and securing the conventional lantern-type or similar spring assemblies 20 which provide resilient support for the fuel rods when disposed in the fuel rod openings 16. The spring assemblies 20 as shown comprise a plurality of vertically extending members 22 located at selected intersecting joints and which extend resiliently into the adjacent fuel rod openings. While the present invention is shown with spring assemblies 20, this is only for purposes of illustrating the overall environment of the present invention. It should be understood that various other types of spring supports for the fuel rods used in a spacer incorporating the features of the present invention may be used, and further it should be understood that the spring supports for the fuel rods form no part of the present invention, as the utility of the present invention does not rely on the type of spring support employed.

As shown the intersecting strips 14 are welded together at each junction with the weld being generally designated 26. At each intersecting joint of the strips where a mixing vane is desired, there is provided either a substantially solid mixing vane 28 or a slotted vane 30 containing a longitudinally disposed slot 32. These mixing vanes are disposed so as to provide the desired directional flow of the fluid coolant as explained heretofore. Each vane includes a small opening or window 34 which according to the preferred embodiment is formed at the bottom end in the center of each vane and directly above and adjacent the junction of the intersecting strips. While the windows 34 as shown are semicircular in nature, it is also within the scope of this invention to employ windows of other shapes and configurations such as rectangular, oval, square, etc. It also is possible to locate the window other than as shown, for example, slightly above the bottom of the vane. The function of the window in each case is to minimize the effects of or substantially eliminate flow separation on the downstream side of the mixing vane. This results in an improvement of the vane's fluid mixing capability between subchannels. The intersecting joints are formed in the usual manner by providing strips 14 with complementary slots 36 which are oriented as shown in FIG. 2(a) for engagement. The upper or vane strips 14 at the edge opposite from the slot 36 is provided with an integrally formed vane 30. The vane has formed therewith in the area where the window is to be provided, a tab 38 complementary to the shape of the window. The lower spacer strip 14 is provided at its edge which contains the slot 36 with a tab 40 similar to tab 38, only being slotted which comprises a continuation of the slot 36 by virtue of the orientation of the tab directly over the slot 36. These strips, when intersected as shown in FIG. 2(b), have their tabs similarly intersected with the top of the tab 40 extended the same as that of tab 38 above the strip edge, as illustrated. These tabs are made of a material such as zircaloy or Inconel which is consumed during the welding of the joints upon application of the welding torch. The consumable tabs 38, 40 are dissolved to form the weld 26 as best shown in FIG. 2(c). The consumable tabs are integral with the intersecting strips which are made of the same material. As shown in FIG. 2(c), the fact that the tabs are consumed during the welding operation has two functions, one being to secure the intersected joint of the intersecting strips and secondly to remove the tab which originally was formed in the vane to provide the window 34 at the base of the vane and directly adjacent the welded joint.

FIG. 3 illustrates an arrangement similar to FIG. 2 only concerned with those locations where it is necessary to slot each of the mixing vanes for the full length thereof due to the orientation of the intersecting strips and vanes. As shown, the intersecting strip is formed with the usual slot 36 at the top edge thereof extending downwardly and at the same location there is provided the consumable tab 38. Also provided is a mixing vane 30 containing a slot 32 which extends from the window 34 upwardly to the upper extremity thereof. On the other spring retaining strip the consumable tab 40 is formed on the edge opposite from the slot 36 and directly adjacent the tab on the same edge of the strip is provided an upwardly extending elongated tab 42 having an upper sloping surface 44. The tab 42 is formed such that its upper sloping surface 44 complements the angular orientation of the mixing vanes, which surface 44 is located adjacent the under surface and is designed to block and support the slot 32 formed in the vane when assembled. Surface 44 may also be used as a reinforcement for the missing vanes by welding the opposing surfaces of slot 32 and surface 44 together as shown at 48. The procedure for forming the welded intersecting joint as shown in FIGS. 3(a), (b), and (c). As discussed, these mixing vanes as shown in FIG. 3 are for those locations on the spacer where the spacer strip must be slotted at the top edge of the mixing vane location, whereas those of FIG. 2 are for locations on the spacer where the strip with which the mixing vane is integrally formed is slotted at its bottom edge below the mixing vane.

The windows 34 formed in each of the mixing vanes serve two relatively important functions, one being to provide an opening in order to accomplish welding of the intersecting cross members or strips, and secondly to provide means for minimizing flow separation on the downstream side of the mixing vane, thus improving the fluid mixing capability of the vanes between subchannels of the core. The window 34 provides a path of fluid communication such that the decelerating fluid particles on the downstream side of the mixing vane are removed through the window by the decelerating fluid on the upstream side of the vane. This is clearly shown by the FIG. 5 elevational view of the vane 30 and while the use of the vane having a tab 42 is shown, this also would be true of those vanes according to the present invention which are at locations that do not require the tab. Under those fluid conditions in which the suction effect of the accelerating fluid is sufficiently strong, separation on the downstream side of the vane will be prevented by providing the window. These conditions would include all anticipated flow conditions during normal and transient core operating conditions. By eliminating or at least reducing fluid separation the pressure losses of the grid spacer which are normally attributable to fluid friction and acceleration, can be reduced and the directional movement of the fluid from one subchannel to another thereby improved. With the present invention the fluid streamlines on the downstream surface of the mixing vane will assume a trajectory which is similar in many ways to a frictionless flow pattern. This advantage can be seen by looking at FIG. 4 which illustrates a typical prior art mixing vane which does not have a window at the spacer strip intersection joint. As shown, the flow streamlines have pressure differentials which result from acceleration differences between the flow on the upstream and downstream sides, thereby causing flow separation on the downstream side. This in turn reduces the extent of fluid directional change on the downstream side which is desired for purposes of obtaining uniform cooling of the fuel rods, thereby reducing the extent of subchannel mixing. The type of circulation provided by the entry of the decelerating fluid on the downstream side through the window and mixing with the fluid on the upstream side reduces flow separation on the downstream side as previously discussed.

Turning now to FIG. 6 there is shown a top view of a grid spacer 10 containing fuel rods 46 disposed in the fuel rod openings 16 and having a plurality of mixing vanes 28 and 30 constructed and formed in accordance with the present invention and arranged to provide the desired directional flow of liquid coolant. The type of directional flow and pattern assumed by the liquid coolant as it leaves the grid spacer and proceeds axially upward along the fuel rod elements toward the next grid spacer can be varied depending upon the particular fuel design and type of cooling requirements therefor. The importance of the present invention used in any such pattern is the elimination and reduction of the fluid separation which as indicated will improve the between subchannel fluid mixing capability of the vanes and also permits forming cross member or strip intersection welds in a desirable and expedient manner.

It will be appreciated from the foregoing description that a novel and improved nuclear fuel grid spacer for a nuclear fuel reactor has been disclosed and enjoys significant advantages over conventional spacers as discussed heretofore. It should be understood that the specific construction and arrangement and methods illustrated and described are intended to be representative of a preferred embodiment only and that certain changes may be made therein without departing from the clear teachings of the present disclosure. Accordingly, reference should be made to the following appended claims in determining the full and true scope of the present invention.

What is claimed is:

1. A method of forming a grid spacer adapted to support nuclear fuel rods in fixed spacial relation, wherein said spacer includes a plurality of intersecting and interlocking strips with said strips forming intersecting joints throughout said spacer, comprising the steps of: joining said strips to form said plurality of intersecting joints; providing at predetermined ones of said intersecting joints a plurality of vanes of predetermined configuration and angularly disposed relative to said strips; forming from said vane first protruding tabs which extend from the edge of said strips carrying said vanes at said intersecting joints which have said vanes; forming a second plurality of protruding tabs on the other of said strips which intersects with the strips which carry said vanes and located at each of said intersecting joints which has a first protruding tab, such that said first and second tabs are disposed in intersecting relation; fusing said protruding tabs at said intersecting joints down into said intersecting joints such that said protruding tabs are consumed whereupon there is formed in said vanes an opening at the base thereof having a shape of the same general configuration as that of said first protruding tab, whereby the flow mixing capability of said spacer is improved.

2. The method of claim 1 including the steps of: forming slots in predetermined ones of said vanes; providing a support tab extending upwardly from the edge of said strips containing said second protruding tab located directly below said slot in said vane.

3. The method of claim 1 including the step of: forming said slots in said predetermined vanes from said opening to the opposite end of said vane.

* * * * *